United States Patent
Shin et al.

(10) Patent No.: US 8,873,121 B2
(45) Date of Patent: Oct. 28, 2014

(54) OPTICAL PROBE USING SENSOR AND METHOD FOR CONTROLLING THE SAME

(75) Inventors: In Hee Shin, Gwangju (KR); Hyun Seo Kang, Gwangju (KR); Young Sun Kim, Daejeon (KR); Hyoung Jun Park, Gwangju (KR); Kwon Seob Lim, Gwangju (KR); Jong Jin Lee, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 214 days.

(21) Appl. No.: 13/476,108

(22) Filed: May 21, 2012

(65) Prior Publication Data

US 2013/0027760 A1    Jan. 31, 2013

(30) Foreign Application Priority Data

Jul. 29, 2011  (KR) .................. 10-2011-0076050

(51) Int. Cl.
*G02B 26/08* (2006.01)
*G02B 26/10* (2006.01)

(52) U.S. Cl.
CPC .................................. *G02B 26/103* (2013.01)
USPC ......................................................... 359/199.4

(58) Field of Classification Search
CPC .. G02B 2006/00; G02B 2027/00; G01H 1/00; A61B 1/00064; A61B 1/00112
USPC ......................................................... 359/199.4
See application file for complete search history.

(56) References Cited

U.S. PATENT DOCUMENTS

| | | | |
|---|---|---|---|
| 6,564,087 B1 * | 5/2003 | Pitris et al. | |
| 7,435,941 B2 | 10/2008 | Ayres | |
| 7,544,162 B2 | 6/2009 | Ohkubo | |
| 7,952,718 B2 | 5/2011 | Li et al. | |
| 2009/0203991 A1 | 8/2009 | Papaioannou et al. | |

* cited by examiner

*Primary Examiner* — Euncha Cherry
(74) *Attorney, Agent, or Firm* — Rabin & Berdo, P.C.

(57) ABSTRACT

Disclosed are an optical probe using a sensor and a method for controlling the same. The optical probe includes: an optical converter to change a light path of light generated from a light source; a vibrator to convert an electrical signal into a mechanical motion; a transmission member to transmit the motion of the vibrator to the optical converter; a position sensor to sense the position of the optical converter; and a controller to adjust the position of the optical converter by controlling the vibrator based on the position sensed by the position sensor.

12 Claims, 5 Drawing Sheets

WHEN NO
SIGNAL IS INPUTTED

WHEN SIGNAL
IS INPUTTED

WHEN NO SIGNAL IS INPUTTED

WHEN SIGNAL IS INPUTTED

OPTICAL PROBE USING SENSOR AND METHOD FOR CONTROLLING THE SAME

CROSS-REFERENCE TO RELATED APPLICATIONS

This application claims priority to and the benefit of Korean Patent Application No. 10-2011-0076050 filed in the Korean Intellectual Property Office on Jul. 29, 2007, the entire contents of which are incorporated herein by reference.

TECHNICAL FIELD

The present invention relates to an optical probe, and more particularly, to an optical probe using a sensor and a method for controlling the same.

BACKGROUND ART

Recently, many technologies for an optical probe have been proposed, and generally focused on a method of scanning an optical probe. That is because, since a core technology for an optical probe lies in a technique for scanning a sample, much research has concentrated on the development of the scanning technique. Hereinafter, optical probe manufacturing technologies based on the scanning technique will be described as follows.

A first optical probe manufacturing technology has been developed to manufacture an optical probe which changes a light path of light transmitted from an optical fiber toward a scanning mirror using a reflecting mirror, and finally controls the light path using a micro electro mechanical systems (MEMS), thereby implementing a 3D image.

Such an optical probe has an advantage in that it may simply implement an image in real time by finely controlling only the scanning mirror. However, since two mirrors should be used and aligned, the optical alignment and manufacturing process may become complex. Since MEMS is used, the manufacturing cost inevitably increases.

A second optical probe manufacturing technology has been developed to manufacture an optical probe which includes an optical lens on which a focusing lens and a reflecting mirror are attached, and moves the optical fiber front and back or rotates the optical fiber according to an external operation, thereby performing scanning.

Such an optical probe has an advantage in that it may be reduced in size because the focusing lens and the reflecting mirror are attached on the optical fiber. However, it is difficult to control the optical fiber from outside.

In particular, when the optical fiber is twisted or bent during the scanning process of the optical probe which needs to be finely controlled, an inaccurate scanning result may be obtained. In this case, a distorted image may be generated.

A third optical probe manufacturing technology has been developed to manufacture an optical probe which includes a scanning mirror attached to a small motor, and rotates the scanning mirror to perform scanning. Such an optical probe has an advantage in that, since the small motor is used to perform scanning, the optical probe may be reduced in size. However, because of the high-speed rotation of the motor, vibrations may occur in the optical probe, thereby causing an inaccurate scanning result. The use of the optical probe is limited only to a circular symmetric sample.

Since a loss of data existing between radiation angles may occur in the optical probe, it is necessary to separately perform data correction.

A fourth optical probe manufacturing technology has been developed to manufacture an optical probe which includes a scanning mirror attached to the center of a propeller, induces the rotation of the propeller by passing a fluid at a constant speed, and rotates the scanning mirror using the propeller to perform scanning.

Such an optical probe has an advantage in that it is reduced in size. However, a separate fluid supply pipe is required, and it is difficult to constantly control the speed of the fluid.

A fifth optical probe manufacturing technology has been developed to manufacture an optical probe which includes an optical fiber of which the surface is fixed by an external coating, and controls a reflecting mirror using an ultrasonic wave converter installed outside the optical fiber, thereby performing scanning.

In such an optical probe, the optical fiber should be fixed when controlling the reflecting. Therefore, a separate fixing device should be installed in the optical probe, which makes it difficult to manufacture the optical probe. Since scanning is performed by controlling only the reflecting mirror, the focal depth of a light source may differ depending on the position of the reflecting mirror.

The biggest problem of the above-described technologies lies in the scanning method for efficiently scanning a light source generated from the optical fiber. More specifically, the same focal depth (position) should be maintained depending on the position of the scanning mirror, and the scanning mirror should be stably driven when scanning is performed.

As real-time image implementation is requested for a wide area, there is a demand for the development of an optical probe capable of satisfying conditions of wide scanning range and high scanning speed.

SUMMARY OF THE INVENTION

The present invention has been made in an effort to provide an optical probe using a sensor, which is capable of satisfying a scanning range and scanning speed required for maintaining a focal position according to position change of a scanning mirror and implementing an image in real time, and a method for controlling the same.

An exemplary embodiment of the present invention provides an optical probe, including: an optical converter to change a light path of light generated from a light source; a vibrator to convert an electrical signal into a mechanical motion; a transmission member to transmit the motion of the vibrator to the optical converter; a position sensor to sense the position of the optical converter; and a controller to adjust the position of the optical converter by controlling the vibrator based on the position sensed by the position sensor.

Another exemplary embodiment of the present invention provides a method for controlling an optical probe, including: changing, by an optical converter, a light path of light generated from a light source; converting, by a vibrator, an electrical signal to a mechanical motion; adjusting the position of the optical converter by transmitting the mechanical motion to the optical converter; and generating a control signal by comparing the adjusted position of the optical converter to a position set by a controller.

According to exemplary embodiments of the present invention, a light source is converted into parallel light through the parallel light lens, and the focal lens and the reflector are integrally connected to the vibrator. An electrical signal is supplied to the vibrator to perform scanning. At this time, the transmission member and a coupling mount may be used to transmit a linear motion of the vibrator to the focal lens and the reflector, thereby performing scanning. In particular, as the position of the linear motion may be accurately controlled using the position sensor, fine scanning using the optical probe becomes possible. Accordingly, since the scanning process is stably performed, a high-quality image may be implemented. Since the configuration of the system is relatively simple, the manufacturing process may be simplified, and the manufacturing cost may be reduced.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
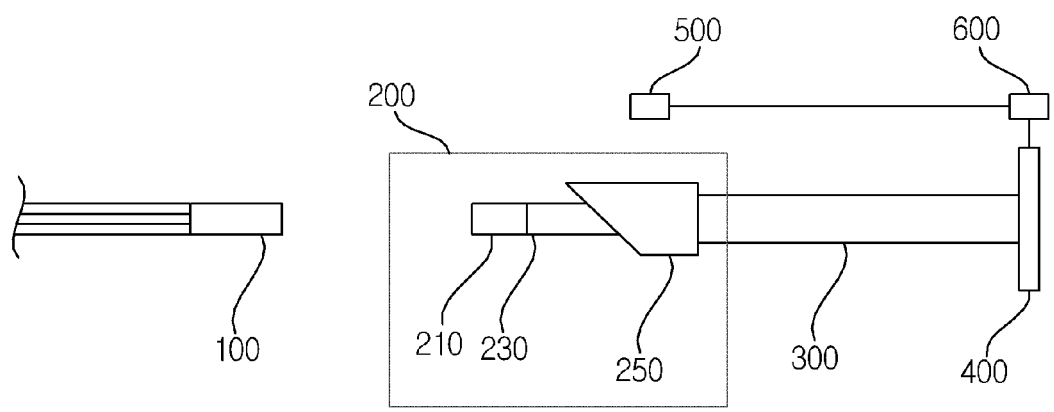
FIG. 1 illustrates an optical probe using a sensor according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

FIG. 1 illustrates an optical probe using a sensor according to an exemplary embodiment of the present invention and an optical cable connected to the optical probe. The optical probe may include a parallel light lens 100, an optical converter 200, a transmission member 300, a vibrator 400, a position sensor 500, and a controller 600.

The parallel light lens 100 is configured to receive light generated from a light source and convert the received light into parallel light. For example, the parallel light lens 100 may receive light through an optical fiber, and an end surface of the optical fiber contacted with the parallel light lens 100 may be formed in an angled physical contact (APC) type by considering a Brewster angle, in order to prevent light from being back-reflected toward the optical fiber.

As another example, the parallel light lens 100 may include a graded-index lens, a graded-index fiber and the like, which are generally used.

APC refers to an end cross section of a connector, which is inclined at about 8°. When the end cross section is inclined at about 8°, a reflection loss of light may be reduced.

In the graded-index fiber, the refractive index of the core thereof is the greatest at the center, and gradually decreases toward the edges thereof. Since the speed of light is inversely proportional to the refractive index, light passing around the center of the core has a short propagation length and a low speed. On the other hand, light passing around the edges of the core has a long propagation length and a high speed. Therefore, lights incident on the optical fiber at the same time reach an output terminal almost at the same time, regardless of incident angles.

The optical converter 200 is configured to change the light path of the light generated from the light source, and may include a focal lens 210, a reflector 230, and a coupling mount 250.

The focal lens 210 is positioned at a predetermined distance from the parallel light lens 100, and is configured to control a focal position of the light having passed through the parallel light lens 100.

As a physical distance between the optical converter 200 and the parallel lens 100 differs, the focal position of the light passing through the focal lens differs.

When the focal lens 210 is positioned at a predetermined distance from the parallel light lens 100, the focal position control unit does not have an effect on the parallel light lens 100 and is not affected by the weight of the parallel lens 100, even though the focal position control unit is linearly moved. Therefore, the risk of damage decreases. Therefore, the focal lens 210 may be implemented in such a manner that light passing through the parallel light lens 100 propagates into the air and is then incident on the focal lens 210.

Figure 2:
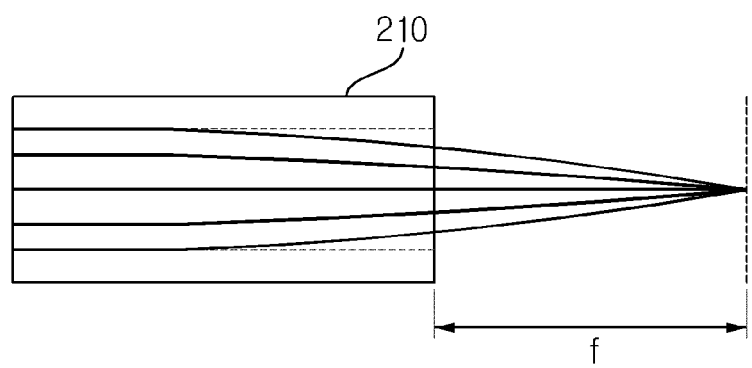
FIG. 2 illustrates a focal lens of the optical probe according to the exemplary embodiment of the present invention.
Figure 2:
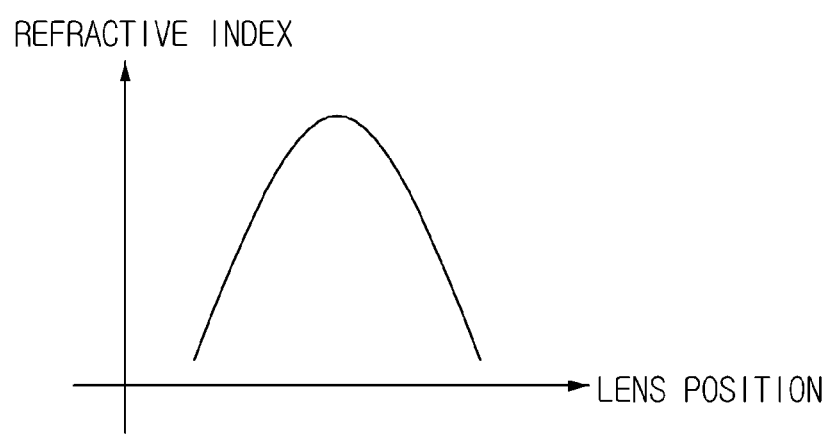

Referring to FIG. 2, the focal lens 210 according to the exemplary embodiment of the present invention will be described. The focal lens 210 may be implemented by adding materials having different refractive indexes into a cylindrical glass depending on the position of the lens, in order to control the refractive index of the lens. For example, a material having a relatively high refractive index may be added into the middle portion of the cylindrical glass, in order to control a focal position f.

As another example, the focal lens 210 may include a cylindrical lens which may be easily bonded to the reflector 230. The focal lens 210 may include a graded-index lens, graded-index fiber and the like, which are generally used.

Figure 3:
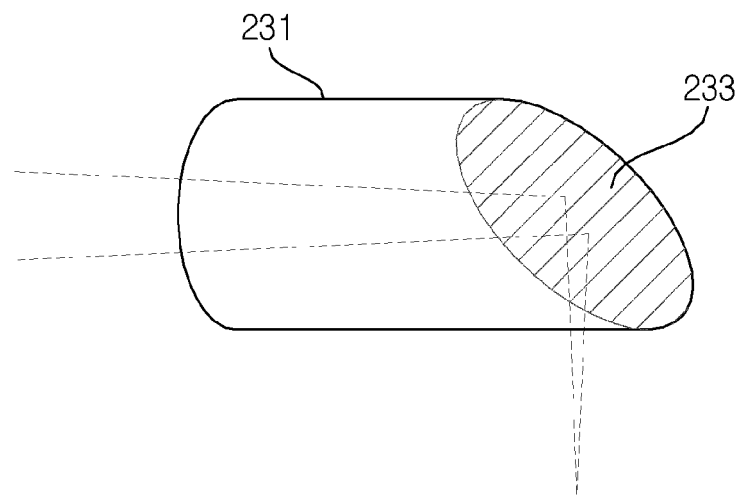
FIG. 3 illustrates a reflector of the optical probe according to the exemplary embodiment of the present invention.

Referring to FIG. 3, the reflector 230 will be described. The reflector 230 is configured to change the light path of the light having passed through the focal lens 210. The reflector 230 may include a tube 231 and a reflector surface 233. The tube 231 is manufactured in such a manner that an end portion thereof has an inclined surface of a predetermined angle, in order for side-view imaging. The reflector surface 233 is formed at the inclined surface of the end portion of the tube 231.

The reflector 230 according to the exemplary embodiment of the present invention may be manufactured using a tube-type glass having an inclined surface of 45°, and may include a reflector surface which has a reflecting film formed on the inclined surface so as to have a reflecting property with respect to the wavelength of the light source. As the light path of the light source is changed 90 degrees by the reflecting film, side-view imaging for a sample becomes possible.

As another example of the reflector according to the exemplary embodiment of the present invention, the reflector surface 233 may be implemented using a silica rod or coreless optical fiber.

According to the exemplary embodiment of the present invention, the optical converter 200 may be coupled to the coupling mount 250 and fixed to the transmission member 300. The coupling mount 210 is coupled to the reflector 230 so as to fix the reflector 230. When the transmission member 300 performs a linear motion, the transmission member 300 transmits the motion to the focal lens 210 and the reflector 230 so as to perform the scanning process of the optical probe.

The coupling mount 250 may be implemented to determine whether or not the position of the optical converter 200, sensed by the position sensor 500, corresponds to a position set by the controller 600.

The transmission member 300 may have one end coupled to the optical converter 200 and the other end coupled to the vibrator 400 so as to transmit the motion of the vibrator 400 to the optical converter 200. The transmission member 300 may be implemented using a rod having a length which may be arbitrarily set by a user.

When the vibrator 400 coupled to the other end of the transmission member 300 receives an electrical signal and performs a linear motion side to side, the transmission member 300 transmits the motion to the optical converter 200, thereby linearly moving the focal lens 210 and the reflector 230 side to side.

The vibrator 400 has a mechanical function of receiving an electrical signal and linearly moving the transmission member 300 side to side. The signal inputted to the vibrator 400 may include an electrical signal in an ultrasonic wave band, and the vibrator 400 may include an elastic material 410 and one or more piezoelectric elements 430.

The vibrator 400 may be implemented using an ultrasonic wave linear motor. In the case of the ultrasonic linear motor, the speed of the linear motion is as high as 35 mm/s, and the range of the linear motion is 15 mm or more. Therefore, real-time imaging may be stably performed.

The piezoelectric element refers to an element which is mechanically deformed when an electrical signal is inputted, and is used for exchange between mechanical energy and electrical energy. For example, the piezoelectric element may be implemented using a piezoelectric ceramic.

The vibrator 400 may be implemented in such a manner that the piezoelectric elements 430 are attached to the left and right surfaces of the elastic element 410.

Figure 4A:
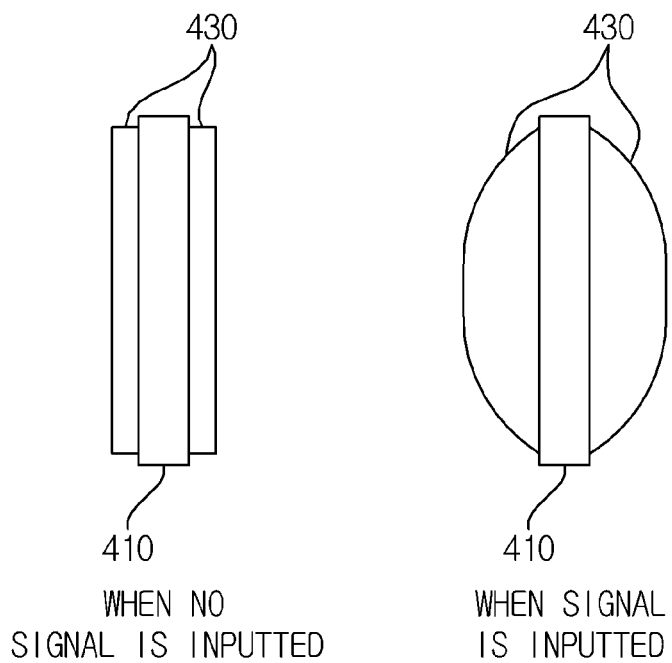
FIG. 4 illustrates a motion of a vibrator of the optical probe according to the exemplary embodiment of the present invention.
Figure 4B:
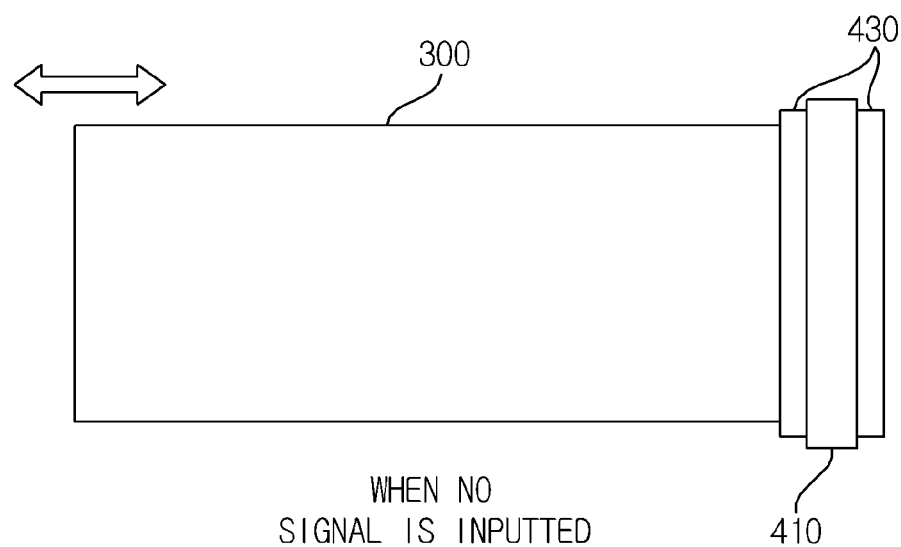
Figure 4B:
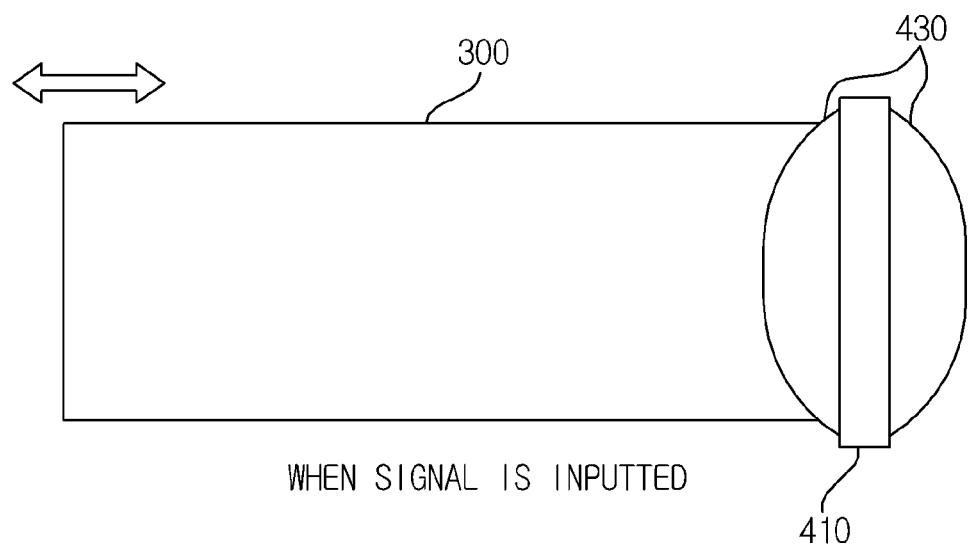
Figure 5:
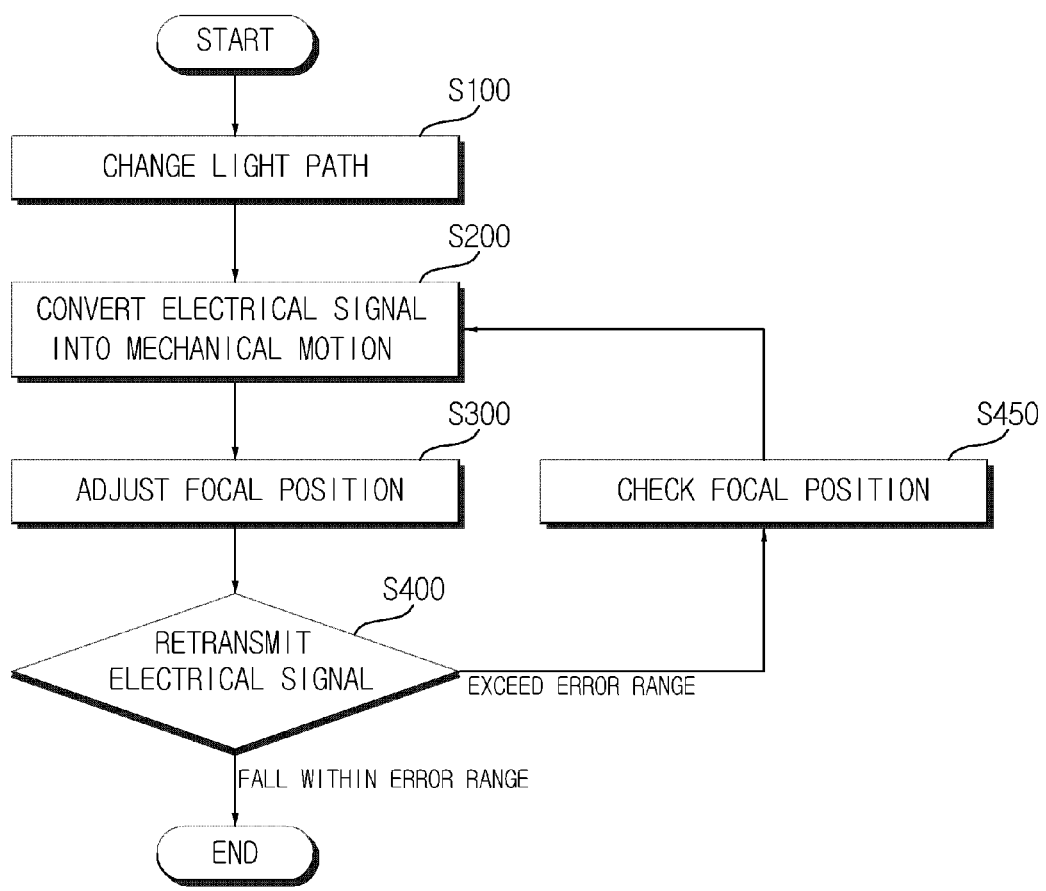
FIG. 5 is a flow chart showing a method for controlling an optical probe according to another exemplary embodiment of the present invention.

Referring to FIG. 4, an implementation example of the vibrator 400 and the optical converter 200 will be described as follows. When an electrical signal is inputted to the vibrator 400, for example, the piezoelectric elements 430 attached to the front and rear surfaces of the vibrator 400, the surfaces of the piezoelectric elements 430 are expanded to cause a mechanical deformation of the vibrator 400, as illustrated in FIG. 4A. When the left and right surfaces of the vibrator 400 are expanded, the vibrator rod 300 connected to the vibrator 400 performs a linear motion side to side, as illustrated in FIG. 4B.

The position sensor 500 is configured to sense the position of the optical converter 200, and transmit the position information to the controller 600. For example, a data signal generated from the position sensor 500 may be transmitted to the controller 600 through a wire.

When the position of the optical converter 200 sensed by the position sensor 500 does not correspond to the position of the optical converter set by the controller 600, the controller 600 sends an electrical signal to the vibrator 400 so as to adjust the position of the optical converter 200.

According to the determination of whether or not the position of the optical converter 200 corresponds to the position set by the controller 600, the controller 600 sends an electrical signal to the vibrator 400 so as to adjust the position of the optical converter 200. The position sensor 500 senses the position of the coupling mount 250 coupled to the optical converter 200, and transmits the sensed position to the controller 600. When the sensed position deviates from a critical value set by a user, the controller 600 inputs an electrical signal to the vibrator 400, and controls the position of the coupling mount 250 through the transmission member 300, thereby controlling the position of the optical converter 200. However, the present invention is not limited to the exemplary embodiment.

FIG. 6 is a flow chart showing a method for controlling an optical probe using a sensor according to another exemplary embodiment of the present invention.

At step S100, the optical converter converts light generated from a light source into parallel light using the parallel light lens 210, and causes the parallel light to be incident to the focal lens. The optical converter controls the focal position of the incident parallel light by adjusting the position of the focal lens with respect to the incident parallel light, and changes the light path using the reflector.

At step S200, the vibrator receives an electrical signal, and performs a mechanical motion such as expansion or contraction to such an extent as to correspond to the received electrical signal.

At step S300, the transmission member transmits the mechanical motion of the vibrator to the optical converter, and linearly moves the position of the optical converter side to side, thereby adjusting the position of the optical converter. As the position of the optical converter is adjusted, the focal position of the light is adjusted.

At step S400, the controller recognizes the position of the optical converter, compares the position of the optical converter to a position set by the controller, and checks whether the optical converter is set at the target position or not. In this exemplary embodiment of the present invention, the focal position of the light may be sensed by the position sensor. When the focal position deviates from a critical value of the position set by the controller, a user may determine that the optical converter is not set at the target position.

When the sensed position of the optical converter exceeds the error range of the position set by the controller, the controller sends a control signal to the vibrator and readjusts the position of the optical converter at step S450.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An optical probe, comprising:
   an optical converter to change a light path of light generated from a light source;
   a vibrator to convert an electrical signal into a mechanical motion;
   a transmission member to transmit the motion of the vibrator to the optical converter;

a position sensor to sense a focal position of the optical converter; and a controller to adjust the focal position of the optical converter by controlling the vibrator based on the focal position sensed by the position sensor.

2. The optical probe of claim 1, wherein the optical converter includes:

a focal lens to refract the light; and a reflector to change the light path of the light passing through the focal lens, and the position sensor senses the focal position of the optical converter.

3. The optical probe of claim 2, wherein the optical converter further includes a component coupled to a coupling mount and fixed to the transmission member.

4. The optical probe of claim 2, wherein the position sensor senses the focal position of the optical converter, and transmits sensed position information to the controller.

5. The optical probe of claim 4, wherein, when the focal position of the optical converter sensed by the position sensor does not correspond to a position of the optical converter set by the controller, the controller sends an electrical signal to the vibrator, and adjusts the focal position of the optical converter.

6. The optical probe of claim 2, wherein the focal lens includes a medium selected to control a refractive index of the light.

7. The optical probe of claim 2, wherein the reflector includes:

a tube having an end portion with an inclined surface of predetermined angles, in order to perform side-view imaging; and a reflector surface formed at the inclined surface at the end portion of the tube.

8. The optical probe of claim 1, wherein the vibrator includes:

an elastic material; and one or more piezoelectric elements attached to the elastic material and having a surface which is expanded/contracted in response to an inputted electrical signal.

9. The optical probe of claim 1, further comprising:

a parallel lens to convert the light generated from the light source into parallel light and cause the parallel light to be incident on the optical converter.

10. A method for controlling an optical probe, comprising:

changing, by an optical converter, a light path of light generated from a light source;

converting, by a vibrator, an electrical signal to a mechanical motion;

adjusting a focal position of the optical converter by transmitting the mechanical motion to the optical converter; and generating a control signal by comparing the adjusted focal position of the optical converter to a position set by a controller.

11. The method of claim 10, wherein the adjusting of the focal position of the optical converter includes transmitting the mechanical motion of the vibrator to the optical converter and linearly moving the position of the optical converter, thereby adjusting the focal position of the optical converter.

12. The method of claim 10, wherein the generating of the control signal includes, when the focal position of the optical converter recognized by the controller exceeds an error range of the position set by the controller, sending a signal to the vibrator so as to readjust the optical convertor.

* * * * *